United States Patent [19]
Martin et al.

[11] Patent Number: 5,165,884
[45] Date of Patent: Nov. 24, 1992

[54] METHOD AND APPARATUS FOR CONTROLLED REACTION IN A REACTION MATRIX

[75] Inventors: Richard J. Martin, Sunnyvale; John D. Stilger, San Jose; Mark R. Holst, Concord, all of Calif.

[73] Assignee: Thermatrix, Inc., San Jose, Calif.

[21] Appl. No.: 726,060

[22] Filed: Jul. 5, 1991

[51] Int. Cl.⁵ .............................................. F23D 3/40
[52] U.S. Cl. ...................................... 431/7; 431/170; 431/75; 431/80; 110/190; 236/78 B
[58] Field of Search ................... 431/7, 170, 75, 80; 110/190

[56] References Cited

U.S. PATENT DOCUMENTS

| | | | |
|---|---|---|---|
| 2,795,054 | 6/1957 | Bowen III | 34/35 |
| 3,661,497 | 5/1972 | Castelluci et al. | 431/7 |
| 3,732,919 | 5/1973 | Wilson | 165/110 |
| 3,769,922 | 11/1973 | Furlong et al. | 110/28 |
| 3,810,732 | 5/1974 | Koch | 431/7 |
| 3,888,193 | 6/1975 | Kishigami et al. | 110/8 |
| 3,942,264 | 3/1976 | Zenkner | 34/35 |
| 4,087,876 | 5/1978 | Fillman et al. | 14/72.5 |
| 4,252,070 | 2/1981 | Benedick | 110/211 |
| 4,310,020 | 1/1982 | Jesperson et al. | 137/563 |
| 4,400,356 | 8/1983 | McVay et al. | 422/171 |
| 4,475,884 | 10/1984 | Shang et al. | 431/170 |
| 4,529,374 | 7/1985 | Malik et al. | 431/7 |
| 4,593,754 | 6/1986 | Holl | 165/109.1 |
| 4,643,667 | 2/1987 | Fleming | 431/7 |
| 4,646,660 | 3/1987 | Bjorkman et al. | 110/210 |
| 4,688,495 | 8/1987 | Galloway | 110/250 |
| 4,716,844 | 1/1988 | Koch | 110/341 |
| 4,741,690 | 5/1988 | Heed | 431/7 |
| 4,807,695 | 2/1989 | Ward | 165/4 |
| 4,823,711 | 4/1989 | Kroneberger et al. | 110/236 |
| 4,828,481 | 5/1989 | Weil et al. | 431/7 |
| 4,838,782 | 6/1989 | Wills | 431/166 |
| 4,941,415 | 7/1990 | Pope et al. | 110/235 |
| 4,953,512 | 9/1990 | Italiano | 431/170 |

FOREIGN PATENT DOCUMENTS 207809 10/1985 Japan ................................. 431/170

*Primary Examiner*—Carroll B. Dority
*Attorney, Agent, or Firm*—Woodcock Washburn Kurtz Mackiewicz & Norris

[57] ABSTRACT

Method and apparatus are provided for establishing and controlling the stability and movement of a reaction wave of reacting gases in a matrix of solid heat-resistant matter. At least a portion of the bed is initially pre-heated above the autoignition temperature of the mixture whereby the mixture reacts upon being introduced into the matrix thereby initiating a self-sustaining reaction wave, after which, the pre-heating can be terminated. The stability and movement of the wave within the matrix is maintained by monitoring the temperatures along the flowpath of the gases through the bed and adjusting the flow of the gases and/or vapors or air to maintain and stabilize the wave in the bed. The method and apparatus provide for the reaction or combustion of gases to minimize $NO_x$ and undesired products of incomplete combustion.

108 Claims, 7 Drawing Sheets

METHOD AND APPARATUS FOR CONTROLLED REACTION IN A REACTION MATRIX

FIELD OF THE INVENTION

The present invention is directed to a method and apparatus for the controlled reaction, and in particular for combustion, of gases or vapors within a bed matrix whereby the stability and movement of the reaction wave is controlled to minimize or eliminate undesirable emission products such as $NO_x$ and products of incomplete reaction such as CO and hydrocarbons.

BACKGROUND OF THE INVENTION

Many process streams of vapors, such as effluents from chemical processing plants, refineries, etc., utilize combustors to destroy the gases or vapors prior to release to the atmosphere. However, with increasing demands on environmental control of emissions, the use of free flames to combust such effluents is in many cases unsatisfactory. A free flame also results, in some instances, in incomplete combustion and uncontrollable production of undesirable side products. The present process and apparatus provide a method for controlling and stabilizing the reaction wave, which is flameless, in which the gases are reacted within a controlled area of the matrix at substantially uniform and relatively low temperatures. The uniformity of the reaction wave provided by the present invention, and the increased mixing and heat treatment afforded by the matrix according to the present invention, provide for a high conversion of reactants to products. Moreover, this conversion may be obtained at lower temperatures and residence times than those required in a conventional incinerator. There is also inherent safety in the use of a process in which there are no open flames, and in which the mixture of gases to be introduced into the matrix is relatively cool, outside the flammability limits of the constituents, and therefore, not explosive under ambient conditions.

It is therefore an object of the present invention to provide a method and apparatus for flameless oxidative reaction of gases or vapors to minimize or reduce $NO_x$ emission and products of incomplete combustion.

It is yet a further object of the present invention to provide an apparatus producing a stable, yet controllably movable reaction (combustion) wave in a matrix without the use of catalytic materials.

It is a further object of the present invention to provide a method and apparatus for the destruction of gases and vapors, or the combustion of fuel, such as natural gas or organic vapors, whereby the input mixture of gases may be outside the explosion limit of the constituents. Exemplary compounds include, hydrocarbons, oxygenated hydrocarbons, aminated hydrocarbons, halogenated compounds, and sulfur-containing compounds.

It is yet another object of the present invention to provide a method and apparatus for the minimization of thermal- and fuel-$NO_x$ combustion by-products to levels substantially below those achievable by conventional combustion technologies such as premixed, nozzle-mixed, or staged burners, or by $NO_x$ removal processes such as Thermal De-$NO_x$, Selective Catalytic Reduction, and Rap-Re-$NO_x$. Additionally, the present invention allows for minimization or elimination of nitrous oxide ($N_2O$) and ammonia ($NH_3$), which are often by-products of the $NO_x$ removal techniques.

The present process and apparatus provide a method for controlling and stabilizing the reaction or combustion of gases within a solid matrix, whereby the reactions occur without any definable flame, but rather within a reaction wave in a controlled area of the matrix, at a substantially uniform temperature.

These and other objects will be apparent from the following description, appended drawings, and from practice of the invention. The following description will be made in conjunction with reactions describing combustion, such as combustion of natural gas, but the present invention is not limited to the combustion of gases with the object of minimizing $NO_x$ and other products of incomplete combustion. The controllability and versatility of the method and apparatus according to the present invention also provide, if desired, the ability to synthesize NO, CO, hydrocarbons, or selected products of incomplete combustion, for example, by varying the outlet temperatures of the reactor, inlet composition of the stream, the residence time of the stream within the reactor, stream heating value, etc.

This method and apparatus can be functionally applied to processes where the minimization of $NO_x$ and PICs (products of incomplete combustion) is desired in conjunction with either (a) destruction of a particular gas or vapor, or (b) combustion of fuel to generate heat.

SUMMARY OF THE INVENTION

The present invention provides a method for establishing, maintaining and controlling the stability and movement of the reaction wave of the reaction of gases or vapors comprising the steps of directing a mixture of the gases or vapors, with air and/or oxygen, into a bed of solid heat-resistant matter, at least a portion of the bed initially being above the autoignition temperature of the mixture, whereby the mixture ignites and reacts exothermally in the bed, forming the reaction wave. Within an appropriate range of inlet mixture compositions, the reaction is self-sustaining; no external heat being required to maintain the process temperature. The location and stability of the reaction wave of the reacting mixture within the bed is controlled by monitoring the temperatures along the flowpath of the mixture through the bed and adjusting the flow of gases or vapors, and air or oxygen to maintain and stabilize the reaction wave. The invention provides an apparatus for utilizing this method comprising a bed of solid heat-resistant matter, which bed may be insulated to the exterior environment; means for introducing the gases or vapors into the bed, means for mixing the air or oxygen with the gases, and means for controlling the volume and/or flowrate of the gases and vapors, air or oxygen into the bed. The apparatus will also have means for monitoring the temperature at one or more points along the flowpath of the gases in the bed, means for adjusting the flowrate and/or volume of the gases in response to temperature changes in the bed and means for exhausting the products of combustion from the bed.

DESCRIPTION OF THE PREFERRED EMBODIMENTS

Figure 1:
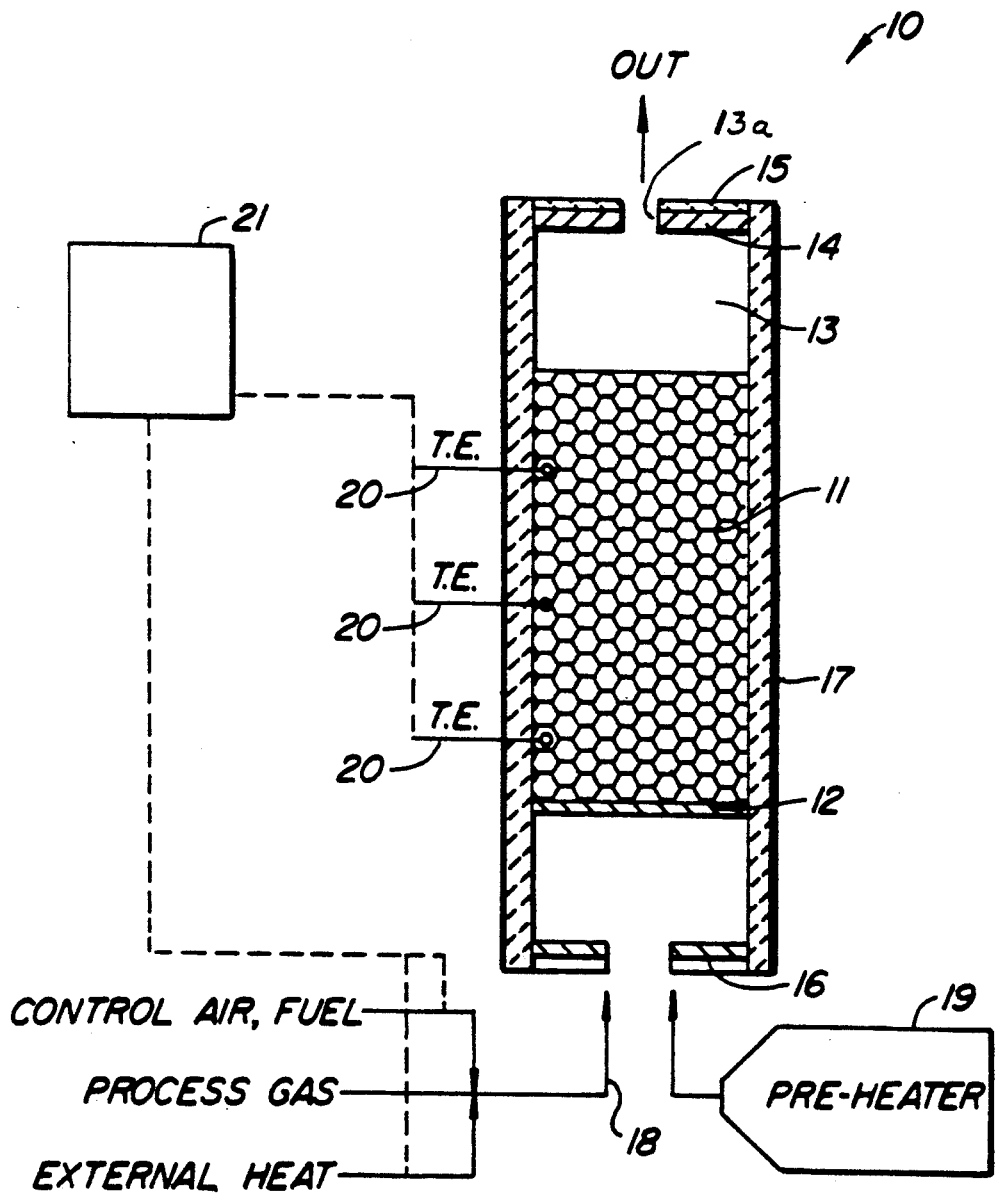
FIG. 1 is a schematic view of a preferred apparatus for use in accordance with the present invention.

The apparatus according to the present invention contains a bed of heat-resistant material and means for monitoring the temperature along the flowpath of gases through the heat-resistant material. By monitoring the temperature of the reaction wave within the bed matrix and controlling the flow and/or volume of gases entering and leaving the matrix as well as the temperature of the matrix, the reaction wave may be maintained at a relatively uniform temperature radially and at a constant location within the bed. The reaction matrix bed may be sized for any desired flow stream by altering the matrix flow cross-section, height, material, void fraction, outlet temperature, and supplemental heat or fuel value addition, if desired. Preferred matrix materials are ceramic balls, but other bed materials and configurations may be used, including, but not limited to, other random ceramic packings such as saddles or pall rings, structured ceramic packing, ceramic or metal foam, metal or ceramic wool and the like. By maintaining the stability and uniformity of temperature of the reaction wave within the matrix, and as a result of the fundamentally enhanced reaction wave propagation mechanism of inner body surface radiation coupled with forced convection and inner matrix solids thermal conduction, it is believed that the matrix burning velocity of the mixture in the matrix may be independent of, or more independent of the system pressure than the burning velocity of an identical mixture by conventional incineration. This is an improvement over conventional combustors wherein the laminar flame speed of fuel mixtures in air decreases significantly with increasing system pressure. See "Laminar Flame Speeds of Methane-Air Mixtures Under Reduced and Elevated Temperatures", Egolfopoulos, F. N., et al., *Combustion and Flame*, Vol. 76, 375-391 (1989). According to the present invention, the combustion intensity of reacting gases through a unit cross-sectional area would increase directly with pressure, since the mass flow of gases would increase directly with pressure, and the matrix burning velocity is not expected to decrease with pressure. The non-negative dependence of matrix burning velocity on pressure is expected to be a result of one or both of the phenomena of in-matrix, backward-propagating, innerbody surface radiation of heat, and forced-convection of heat from the solid matrix to the incoming gases.

The radiative heat transfer within the bed, the walls of the combustor containing the bed, and the gas molecules within the reactor themselves are important features of the operation of the apparatus and the method of the present invention. Therefore, the types of materials in the bed may be varied so that the inner body heat transfer characteristics; the radiative characteristics, the forced convective characteristics, and the inner matrix solids thermally conductive characteristics, may be controlled within the bed. This may be done by varying the radiative heat transfer characteristics of the matrix by using different sizes of bed materials to change the mean free radiative path or varying the emissivity of the bed materials, varying the forced convection heat transfer characteristics of the matrix by varying its surface area per unit volume, or geometry, varying the inner matrix solids thermally conductive heat transfer characteristics of the matrix by using bed materials with different thermal conductivities, or changing the point to point surface contact area of the materials in the bed. These properties may be varied either concurrently or discretely to achieve a desired effect. In addition to changing the properties of the reaction matrix itself, an interface or several interfaces can be introduced into the bed where one or more of the heat transfer properties of the bed are discretely or concurrently changed on either side of the interface and wherein this variation serves to help stabilize the wave in that location and acts as a "reaction wave anchor." This may be done, for example, by introducing an interface where void fractions change across the interface within the bed. The interface may change the mean free radiative path across the interface independent of the void fraction. By changing materials, the emissivity may change across the interface within the bed. Changing the area per unit volume of the bed media across an interface, the forced convective heat transfer characteristics may change as the gas is passed across the interface.

The matrix cross-section perpendicular to the flow axis may be configured in a circular, square, rectangular, or other geometry. The area of the cross-section may be intentionally varied (i.e. as a truncated cone or truncated pyramid) to achieve a wide stable range of reactant volumetric flowrates at each given matrix burning velocity.

The preferred materials of the bed matrix are preferably ceramic balls or other types of random heat-resistant packing. To evenly distribute incoming gases there will typically, but not necessarily, be a plenum, preferably made of a heat-resistant material such as brick or ceramic balls, in which incoming gases will be preferably distributed and further mixed prior to entering the bed. If a plenum of brick or ceramic balls is used, it will typically comprise a section with very low radial pressure drop, so that cross-sectional gas distribution is maximized, and also cause a slight pressure drop (approximately $\frac{1}{4}$" to 10" W.C.) across the plenum interface prior to the bed in order to more evenly distribute the gases entering the bed. In addition, the plenum may provide an interface, with varying heat transfer characteristics on either side of the interface, in the junction between the plenum and the bed. The exterior reactor walls contain the process flow during operation, and are preferably made of carbon steel. The exterior walls may be lined with a non-permeable, corrosion-resistant coating and a refractory insulating material, such as firebrick, which may be coated with a porosity-reducing compound. Dense castable refractory materials, backed up with insulating refractory materials, such as ceramic fiber board and ceramic fiber blanket, are also preferred lining materials. To bring the gases and/or matrix up to the desired temperature prior to starting the reactor, preferably a preheater may be utilized to preheat the packed bed matrix. Convenient means for mixing the gases and/or oxygen prior to entering the bed may be utilized such as, a venturi-type gas-air mixer. An outlet will be provided, usually at the opposite end of the processor from the inlet, to allow for gases to escape during preheating and/or processing. Temperature sensing means such as thermocouples will be located usually in thermowells inserted into the bed. Usually there will be thermowells located at inlet and outlet ports and in the void spaces in the bed.

A programmable control system may be utilized using the outputs from the thermocouples to automatically adjust the dilution air and/or supplemental fuel to maintain the stability and location of the reaction wave within the bed. Due to the inherently stabilizing thermal mass of the matrix, the reactant gases may be introduced in a continuous or intermittent manner.

For a reactor which processes corrosive gases such as chlorine, hydrogen chloride, sulfur dioxide and others, the steel shell may be maintained at moderately high temperature, preferably 300° to 400° F., to minimize dewpoint corrosion. In addition, the carbon steel shell may be lined with dewpoint corrosion resistant materials, such as Fortress High Temperature Stalastic bitumastic coating (Witco). A porosity-reducing coating, such as Alundum Patch Primer (Norton) on the refractory surface may also reduce the permeation of corrosive agents from the interior of the processor to the carbon steel shell. The interior temperature of the reactor may typically be maintained between 1400° and 3500° F., depending on the process requirements. In a typical process, a preheater is used, fired for example with natural gas, to heat the plenum, if present, and the bed in order to raise the bed temperatures above the autoignition point of the gases which will be used. The pre-heater can be any device which will raise the temperature of the bed directly or any device to pre-heat gases which can then be channeled into the bed to pre-heat the bed itself. Pre-heating devices include: gas burners, electric heaters mounted exterior to or interior of, the matrix, inductive heaters, radiant tube heaters, etc. Once a sufficient temperature has been achieved throughout the entrance portion of the processor, pre-heating is then ceased. Ambient air is then forced with pressure into the plenum, if used, and into the bed until the plenum is cooled to a temperature below the autoignition of the process gases to be introduced. By introducing ambient air through the plenum, the plenum cools the quickest, while the matrix temperature remains largely above the autoignition temperature although the matrix immediately adjacent to the plenum will be cooled below the autoignition temperature. Once this profiling of the bed has been completed, the process gas is introduced into the plenum, if used, and the bed. The combustion wave is established in the matrix whereby the compounds are ignited and oxidized to stable products, such as water and $CO_2$. The combustion wave is observed as a steep increase in bed temperature from ambient temperature on the inlet side of the wave to approximately the adiabatic flame temperature of the mixture on the outlet side of the wave. This rapid change takes place over a distance of usually several inches in a typical pilot processor, with the actual distance being dependent upon feed concentrations, feed rates, gas velocity distribution, bed material, and bed physical properties, type of specific feed materials, etc. Heat losses in the direction of flow also will have an effect on the length of the combustion wave. The wave may be moved with, against or stationary relative to the inlet feed direction by varying the feed gas concentration or flowrate. If necessary, heat may be added to or removed from the incoming gases to further stabilize the wave. If desired, cooled surfaces such as water-containing pipes may be inserted into or around the matrix to remove heat from the reacting gases and further stabilize the reaction wave.

While combustion intensities from 191,520 $W/m^2$ to 744,600 $W/m^2$ have been achieved at sub-LEL conditions in a pilot unit, it is believed that combustion intensities from 7,000 to 1,800,000,000 $W/m^2$ are achievable with this method at non-atmospheric pressures; or for atmospheric pressure applications, combustion intensities from 90,000 to 150,000,000 $W/m^2$ are achievable.

Preferably a plenum is utilized at the entry of the bed for uniformity of mixing, cross-sectional velocity profiles and temperature of the incoming gases. It is believed that this helps to achieve a relatively flat cross-sectional profile of the combustion wave perpendicular to the direction of the flow of the gases through the bed. In some instances the plenum may be desirable to achieve the flatness of the cross-section of the wave, depending on the configuration of the matrix. While in some instances a relatively flat cross-sectional profile of the combustion wave may be desirable, this flatness of cross-sectional profile is not necessary for the device to work, and in some instances a non-flat, spherical, or bullet shaped profile may be desirable, during which instances a plenum may or may not be used. In some cases, a gas permeable barrier may be beneficial to help maintain the mechanical integrity of the matrix during operation where high gas velocities or excessive vibrations occur.

The reaction wave may move or remain stationary relative to the inlet flow direction by increasing or decreasing the percentage of fuel in the inlet mixture. For applications where it is desirable to use gas mixtures below their respective flammability limits, the method is functional at relatively low fuel concentrations, for example from 2.7 to 4.8 volume percent of natural gas in air. For other applications, where the reaction of fuel and oxygen in near- or super- stoichiometric proportions is desired, the method can function at much higher fuel concentrations, for example from 5 to 25 volume percent natural gas in air.

Alteration of the flowrate and composition of the inlet stream may be used to cause the combustion wave to migrate upstream or downstream, however, this motion is slow due to the large thermal mass of a typical matrix. Similarly, unplanned fluctuations in the flowrate and/or composition of the inlet stream may also cause wave migration, however this effect may be reversed by one or more counteracting process changes issued by a programmable controller to control valves governing supplementary fuel and dilution air, in response to changes in sensed temperatures along the bed.

In a typical processor as described in further detail hereinbelow using methane as a feed gas, the destruction and removal efficiency (DRE) of methane has been shown to be greater than 99.99%, independent of the location or direction of propagation of the wave within the matrix.

The emission levels of thermal-$NO_x$ in the same combustor was less than 0.007 lb of $NO_x$ (as $NO_2$) per million BTU, and the CO levels have been observed to be below the lower detection limit (10 ppm) of the CO analyzer. Typically, levels of nitrous oxide will not exceed 0.3 pp by volume.

The burning velocity of the reactant gases in the matrix as described in further detail herein below, even when measured at conditions below the conventional flammability limit of methane in free air, has been observed to be as much as 2 to 10 times greater than the fastest known laminar flame speed of methane in free air.

While the above-described information has been observed, it is contemplated that there is no limit, i.e., minimum or maximum flowrate by which the technology may be utilized. Various plenum configurations, if used, may also be utilized for gas distribution in addition to those described herein in the attached figures. The flow direction is also not believed to be critical so that the system may be preheated or fed from the bottom up, top down, sideways, fed at alternative points in the processor, or the direction of feed may also be alternated.

The preheating means may be electric or any other kind of heating means, and supplemental heating of the process gases may be utilized. The combustion wave may also be utilized in conjunction with regenerative heat recovery or with internal heat recuperation components identical to or similar to those conventionally available for heat recovery systems. While the present invention contemplates bed material without catalysts, a combined inert bed and catalyst may be used to enhance process characteristics such as reaction rate, if so desired. However, a primary feature of the invention is that the catalyst is not a necessity to the operative functions of the stabilizing of the combustion wave.

In addition to its use as a stand-alone processing device, the apparatus of the invention may be employed as an add-on to conventional technology so as to incorporate the benefits of the invention, such as fluctuation dampening capability, etc. The matrix may be appended, for example, to the outlet of a conventional incinerator to provide an additional margin of safety to handle process fluctuations.

Among the advantages of the present invention is the ability to control and diminish the undesirable products of combustion of typical fuels by controlling the stability of the combustion wave within the heat-resistant matrix according to the present invention. For example, the $NO_x$ content of combustion of hydrocarbon gases may be lowered to within the range of about 0.1 to 40 ppm by volume, dry basis, adjusted to 3% oxygen. Similarly, the carbon monoxide content of combustion of hydrocarbon gases may be controlled to be within the range of about 0.1 to 10 ppm by volume, dry basis, adjusted to 3% oxygen. Other products of incomplete combustion may be controlled to comprise less than about 5 ppm of the total gaseous products, by volume, dry basis, adjusted to 3% oxygen. Another advantage is that the process according to the present invention is extremely safe in that the gaseous reactants for the reaction (combustion) wave may be maintained, upon entry into the matrix, at or below the lower explosive limit for the gaseous mixture. This lessens the chance of accidental and premature burning or explosion. Furthermore, the concentration of incoming reactants may be maintained at or above the upper flammability limits of the mixture of gases, further adding to the safety features of the invention, or the concentration of incoming reactants may be maintained between the upper and lower flammability limits of the mixture of gases.

Since the combustion or reaction wave according to the present invention is maintained within a matrix, rather than an open flame in a chamber or in open atmosphere, many more controls may be imposed upon the characteristics of the combustion wave. The objects which comprise the heat-resistant matter in the bed may be selected by size and shape to obtain a predetermined mean-free radiative path in the matrix. Furthermore the materials of the heat-resistant matter may be selected so that particles may be placed within the bed having appropriate emissivities to obtain a predetermined back heat transfer from the particles into the combustion or reaction wave, thereby improving the desirable characteristics and stability of the wave.

One of the characteristics attainable by the present invention is the stabilization of the combustion or reaction wave at feed flowrates, such that the velocities of the mixtures of gases entering the wave when calculated and adjusted to the conditions of standard temperature and pressure, are greater than the laminar flame speed of the mixture at the same conditions in absence of the matrix. This calculated velocity may be obtained using the present invention whereby the velocity is about 1 to 1,000 times greater than the laminar flame speed, preferably 1 to 50 times greater than the laminar flame speed, which therefore allows for greater throughput of the reaction gases than that of conventional combustion. As further demonstration of the improvements attainable by the present invention, the combustion wave utilizing the present invention may be stabilized at feed flowrates such that the calculated velocities of the mixtures of gases entering the wave, adjusted to conditions of standard temperature and pressure, are greater than the turbulent flame speed of the mixtures at the same conditions without the matrix. This calculated velocity may be 1 to 1,000 times greater than turbulent flame speed and preferably 1 to 10 times greater than turbulent flame speed.

As further demonstration of the improvements attainable by the present invention, a combustion wave maintained and stabilized according to the present invention may typically be characterized by a heat release per unit cross-sectional area which is higher than the heat release per unit cross-sectional area in a laminar or turbulent flame of an identical gaseous mixture at identical conditions, in absence of the matrix of the present invention. Preferably the heat release per unit cross-sectional area for combustion of a typical hydrocarbon gas is 1 to 50 times higher than that observed in a laminar flame or a turbulent flame of an identical mixture of gases at identical conditions, in the absence of the matrix according to the present invention.

Typically a matrix according to the present invention will comprise a ceramic, which may be randomly packed or structurally packed. Preferred random packing comprises ceramic balls which may be layered. Generally, for combustion of hydrocarbon gases the ceramic balls are useful if they have a diameter from about 1/16th" to 3" in diameter, preferably about ¾" in diameter. Another useful configuration is the use of random ceramic saddles typically from 1/16th" to 3" nominal size, preferably about ¼" to 1.5" nominal size. Such ceramic saddles are well known in the art and can be obtained from a number of manufacturers, such as the Intalox ® saddles sold by Norton Chemical Processes Products of Akron, Ohio.

A ceramic foam material may also be utilized. Typical foam material may be utilized which has a void fraction of 10 to 99%, preferably 75 to 95% and most preferably about 90%. The pore sizes in any preferred ceramic foam material will be about 0.1 to 1,000 pores per inch and preferably about 1 to 100 pores per inch and most preferably about 10 to 30 pores per inch.

Other shapes of ceramic material may be utilized such as honeycomb shape ceramic.

Instead of a ceramic, the heat-resistant matter used to form the bed may also be a metal, which may be randomly packed or may have a structured packing.

In a preferred embodiment, a combustion wave of hydrocarbon gases may be stabilized and maintained in a ceramic matrix wherein the combustion wave is characterized by a length scale of greater than 0.1 centimeter, preferably about 2" to 16" and most preferably about 8". In general, a combustion wave according to the present invention is characterized by a length scale of 1 to $10^9$ times the combustion wave length scale of an identical mixture, combusting under identical conditions, in absence of the matrix. Typically a combustion wave according to the present invention may be characterized by a length scale of 1 to $10^6$ times the combustion wave length scale, and most preferably 1 to 1,000 times the combustion wave length scale of an identical mixture under identical conditions, in absence of the matrix. A combustion wave according to the present invention at least may be characterized by a length scale of 1 to 100 times the combustion wave length scale of an identical mixture combusting under identical conditions in absence of the matrix.

Referring to the figures, FIG. 1 is a schematic diagram of a cross-section of an apparatus used for practicing the process according to the present invention. The apparatus comprises of a processor (10) comprising a matrix (11) of heat-resistant packing material supported at the bottom by a plenum (12) for distributing the gases as they enter into the matrix (11). The void (13) over the top of the matrix (11) precedes the outlet (13a) which penetrates the end wall (14) made of a dense castable refractory material (14) behind which there is an insulating layer (15). The product gases exit through the refractory (14) and insulator (15) through the outlet (13a). A dense castable refractory material (16) also seals the bottom of the processor (10). The sides of the processor (10) are encased with a insulated shell (17), preferably made of steel and lined on the inner surface with another insulating heat-resistant material such as firebrick. The inner surface of the steel may be protected by an appropriate corrosion-resistant material. Through the bottom of the processor (10) is an inlet means (18) through which controlled air, fuel and/or process gas is introduced into the processor (10). If necessary, the fuel or process gas may be heated prior to introduction to processor (10) by applying external heat to the mixed process gas prior to entering the processor (10) through line (18). The plenum and lower portion of the matrix (11) may be heated by a suitable preheater (19) which, for example, may pass forced heated air into the processor (10). At various points in the matrix (11) are located temperature sensing devices such as thermocouples (20) from which the output is fed into a microprocessor or programmable logic controller (PLC) (21) which in turn controls the input of the fuel and/or process gas and control air or heat supply to control the proportions, flow and temperature of the input gases entering through line (18) into the processor (10).

Figure 2:
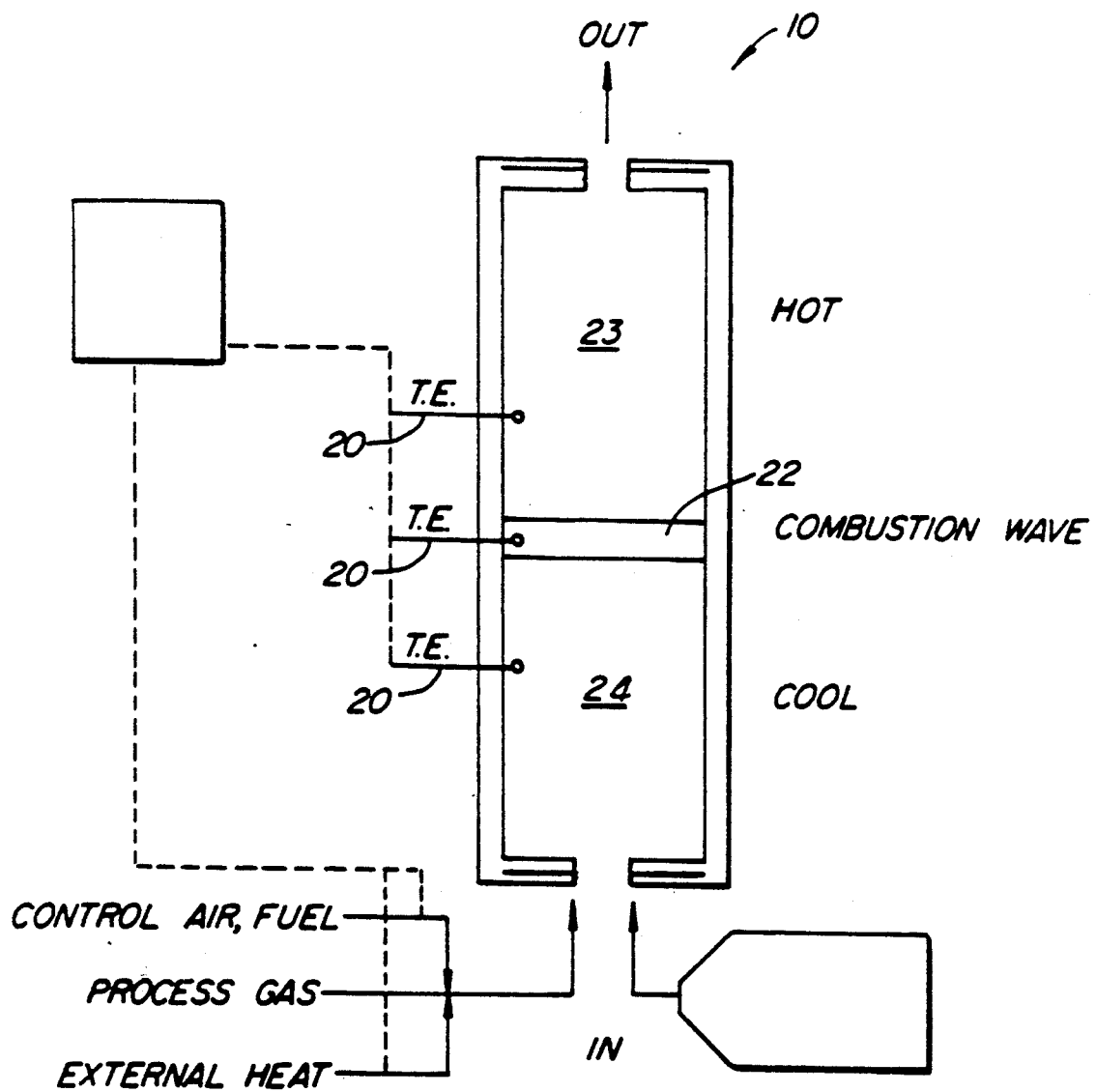
FIG. 2 shows the hot and cool zones in the apparatus of FIG. 1 during operation.

Referring to FIG. 2, there is shown a schematic of the internal temperature zones and combustion wave of the processor shown in FIG. 1. Typically, during operation, there will be a cool zone (24) below the uniform oxidation or combustion temperature which is being maintained within the combustion wave. The combustion wave itself (22) will be maintained in a stable shape and uniform temperature at a location within the matrix; and above the combustion wave (22) will be a hot region (23). By using temperature sensors (20), the combustion wave (22) may be located within the matrix and moved to a desired point and maintained to have a desired height by controlling the input end of the processor (10).

Figure 3:
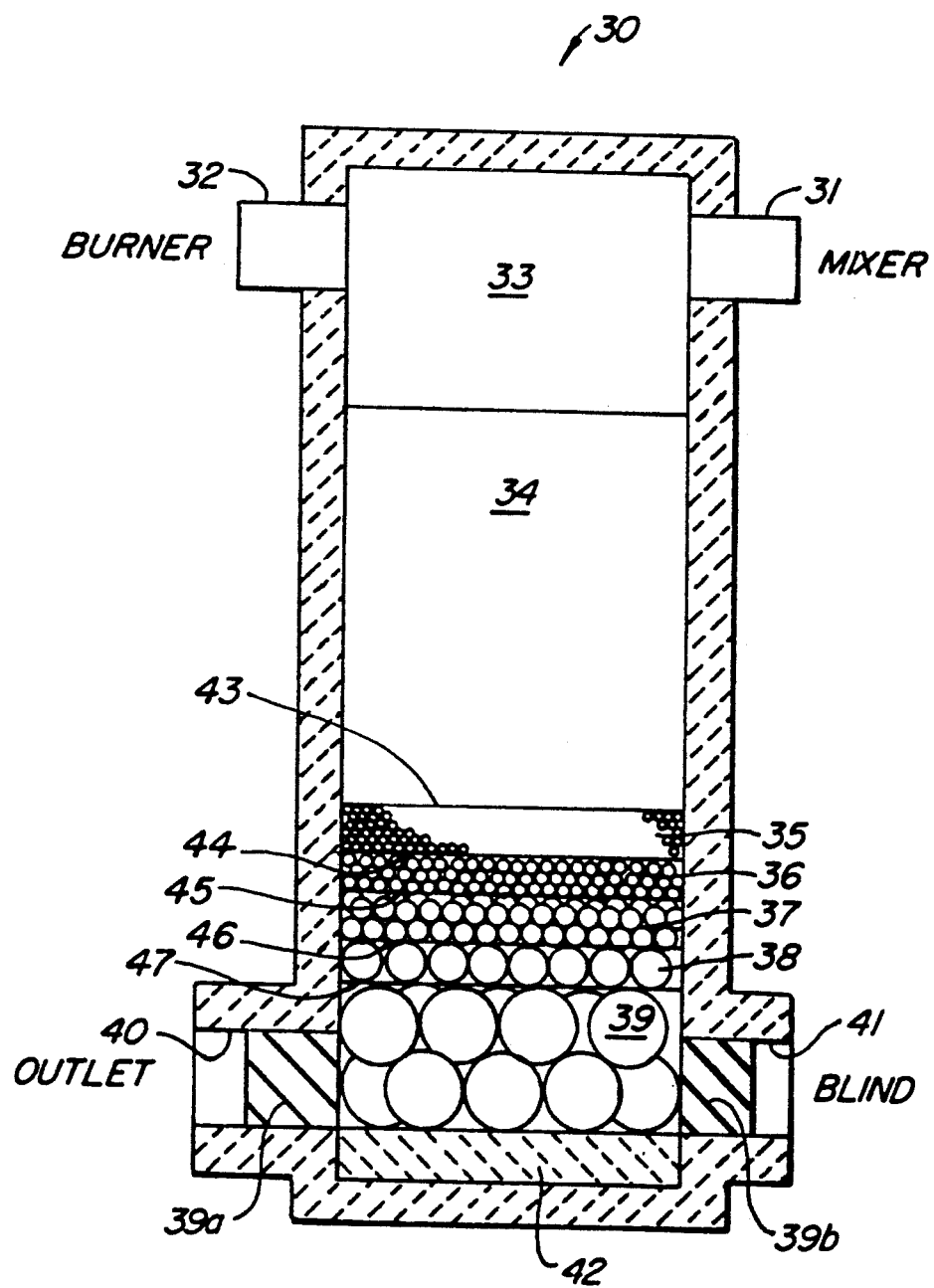
FIG. 3 is a second preferred apparatus for use in accordance with the present invention.

Referring to FIG. 3, there is shown another configuration of a processor which may be utilized according to the present invention. The processor (30) comprises an inlet (31) for introducing process gases and air. The item (32) is an inlet for the preburner for preheating the processor similar to that shown in FIG. 1. The matrix in this instance comprises six different areas. Just below the void (33) there is a stack of ceramic saddles (34) extending through a major portion of the height of the bed. Below the saddles (34) is a series of layers of ceramic balls of increasing size. For example, layer (35) may comprise ½" diameter ceramic balls, layer (36) ⅝" diameter ceramic balls, layer (37) ¾" diameter ceramic balls, and layer (38) 1⅛" diameter ceramic balls. The bottom layer (39) may comprise, for example, 3" diameter ceramic balls, which are retained within the processor (30) by porous ceramic plugs (39a) and (39b). At the bottom of the bed the gases exit through outlet (40) and/or (41), if used. As shown on the bottom of the processor (30), it is insulated by a layer of brick (42).

In addition, in one embodiment, one or more gas permeable barriers or membranes (43),(44),(45),(46), and (47), can be utilized to help maintain the mechanical integrity of the matrix during operation, for example, so that adjacent layers of ceramic materials of differing sizes do not become mixed due to excessive vibration. These barriers or membranes can be comprised of a variety of material so long as they allow for proper gas flow.

Figure 4:
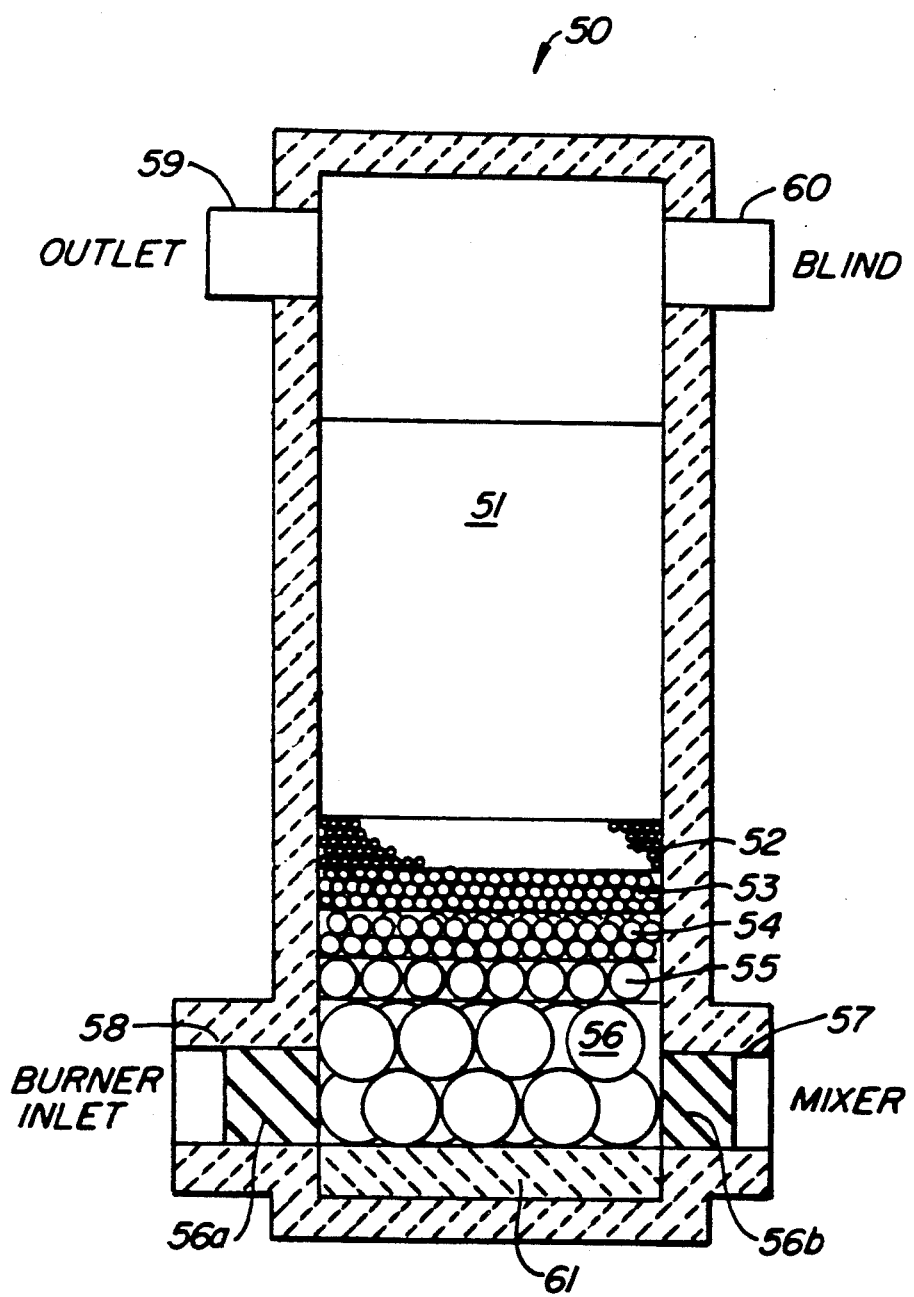
FIG. 4 is yet another preferred apparatus for use in accordance with the present invention.

Referring to FIG. 4, there is shown a processor (50) having a bed configuration similar to that as shown in FIG. 3. The top area of the bed comprises ceramic saddles (51) preceded by a series of layers of ceramic balls of increasing diameter, layers (52) through (56), respectively. The bottom layer 56 is retained within the processor (50) by porous ceramic plugs (56a) and (56b). However, in the configuration shown in FIG. 4, the process gas and air are introduced through inlet (57) at the bottom of the processor (50) and the preheated air for preheating the processor (50) is introduced through inlet (58) also located at the bottom of the processor. Therefore, the gases exit at the top of the processor (50) through outlets (59) and/or (60), if used. The bottom of the processor also comprises a layer of insulation (61) such as brick.

Figure 5:
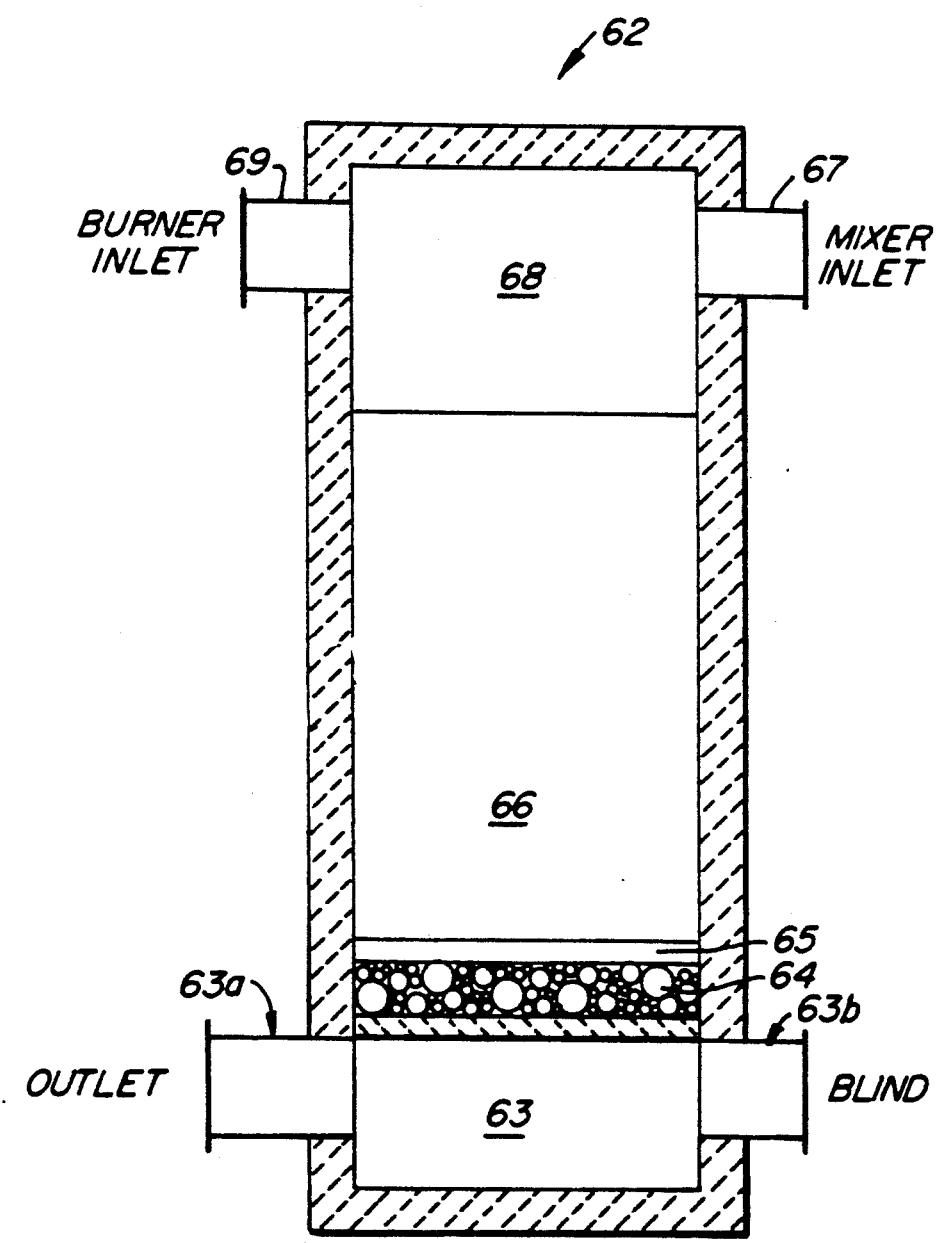
FIG. 5 is another configuration of a preferred apparatus in accordance with the present invention.

Referring to FIG. 5, there is shown yet another configuration of a processor (62). This processor has a brick plenum (63) through which pass gases which exit outlet (63a) or (63b), if used. Above the brick layer (63) is a layer of ceramic balls (64) and a second layer (65) of balls of different sizes than those in layer (64). Finally, there is the major portion of the bed comprising saddles or ceramic balls (66). The inlet gases enter through inlet (67) and pass through void (68) before entering into the matrix layer (66). Preheated air for preheating the processor (62) enter through inlet (69).

Figure 6:
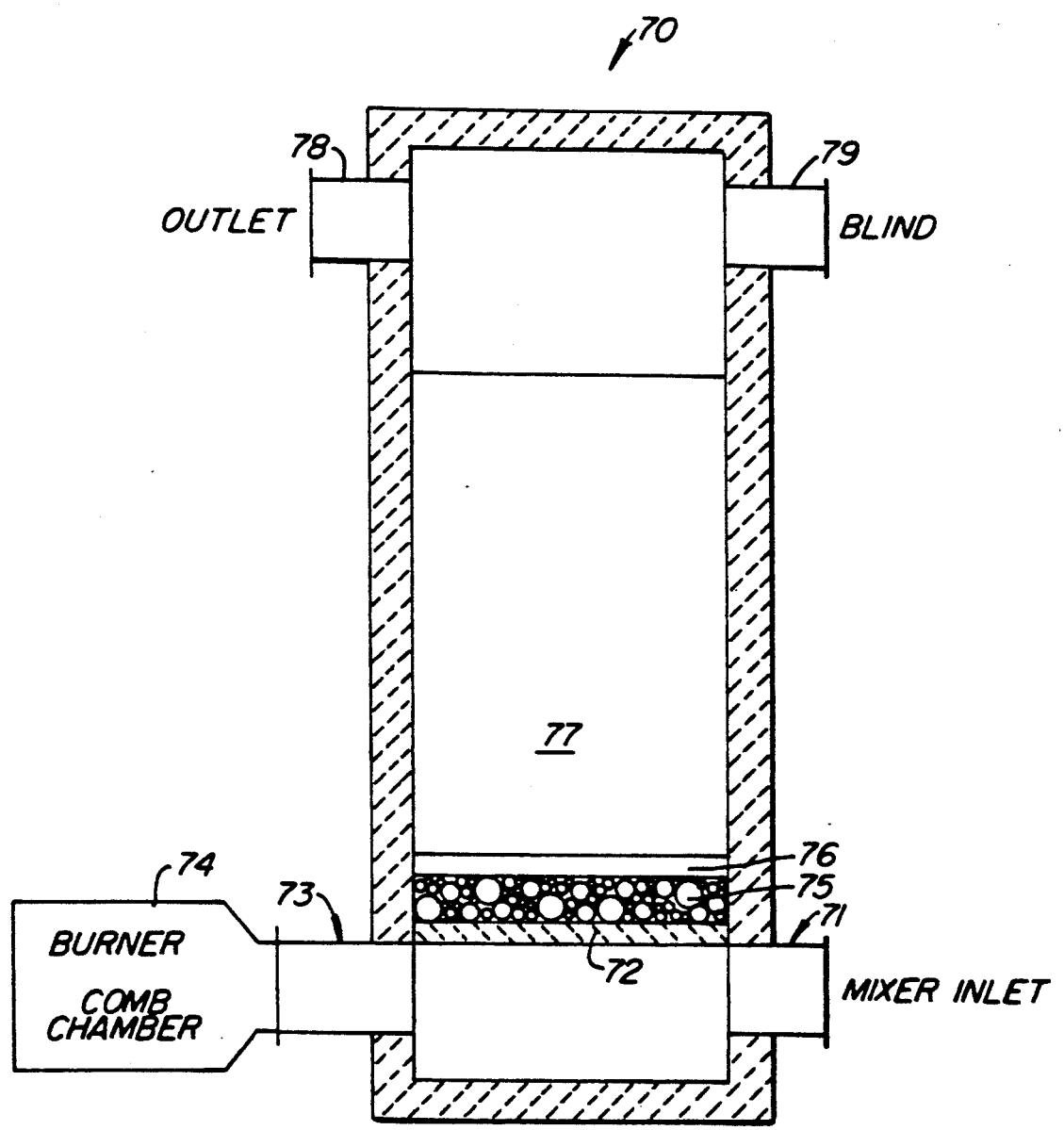
FIG. 6 is a variation of the apparatus of FIG. 5.

Referring to FIG. 6, there is shown the same configuration as shown in FIG. 5 for a processor (70) except that the processing gases pass through the bed in the opposite direction. Accordingly, the process gases and oxygen are introduced through inlets (71) into a plenum lined with brick layer (72). The preheated gases enter through inlet (73) from a preburner (not shown). The preheated air may optionally be formed by combustion in a preburner located on a combustion chamber (74), which combustion chamber serves to more uniformly mix the preheated gases prior to entry into the bed or plenum. The layers of ceramic balls and/or saddles (75), (76), and (77) are as described in connection with FIG. 5 for layers (64), (65), and (66), respectively. The exit gases exit through outlets (78) and/or through outlets (79), if used.

Figure 7:
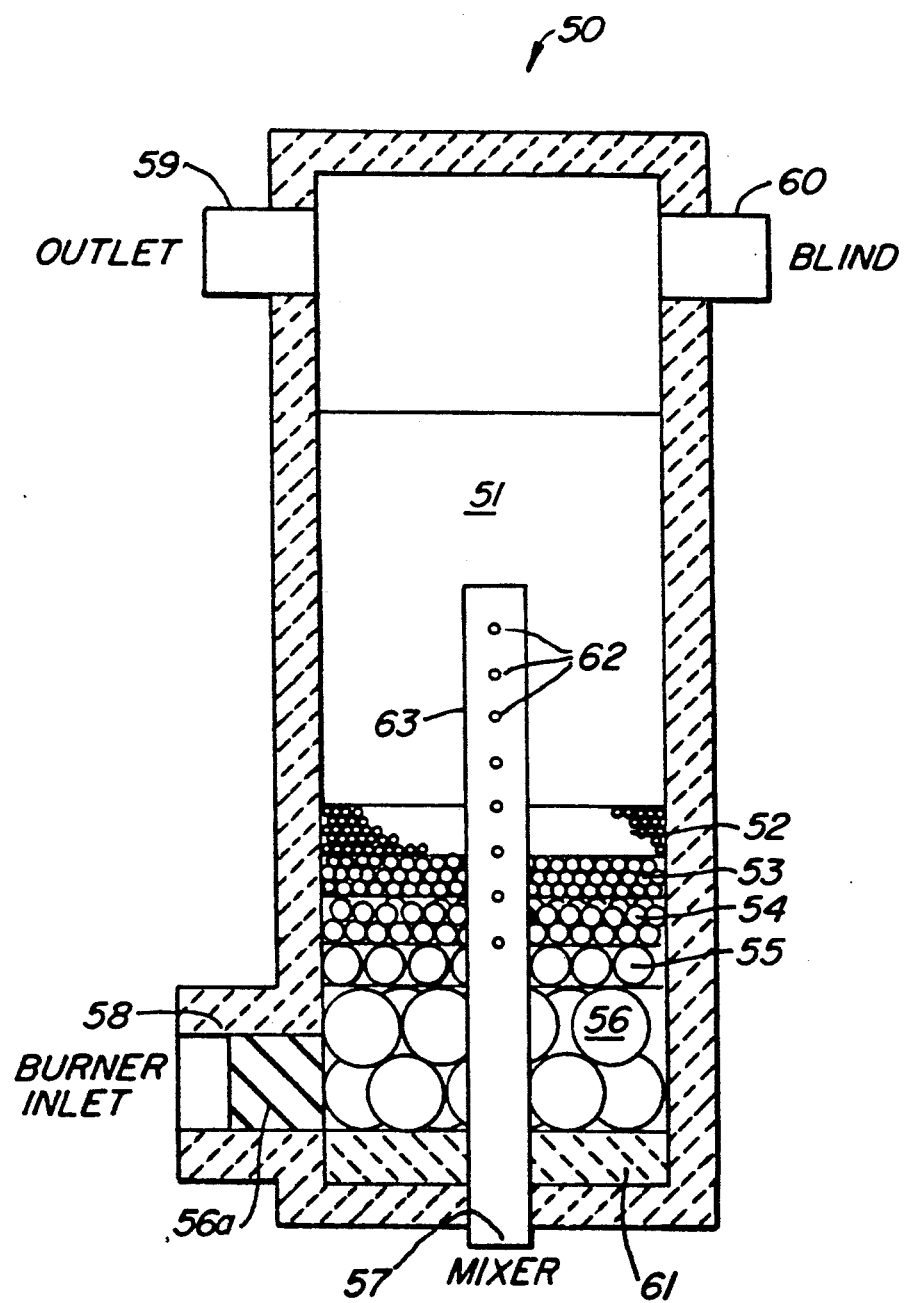
FIG. 7 is another variation of a preferred apparatus of the present invention.

Referring to FIG. 7, there is shown a slightly modified version of the embodiment shown in FIG. 4 and described above. Thus, a processor (50) is shown having a bed wherein the top area of the bed comprises ceramic saddles (51) preceded by a series of layers of ceramic balls of increasing diameter, layers (52) through (56), respectively. The bottom layer (56) is retained within the processor (50) by porous ceramic plug (56a). The gases exit through outlets (59) and/or (60). The bottom of the processor (50) also comprises a layer of insulation (61) such as brick. The preheated air for preheating the processor (50) is introduced through inlet (58), located at the bottom of the processor (50). In this embodiment, however, the process gas and air are introduced to the processor (50) through one or more inlet ports (62) spaced along an injection pipe (63) that projects into the processor (50) through an inlet (57) and is aligned along the gas flow axis of the processor (50). This configuration can be used for staged combustion to further reduce $NO_x$ formation.

While embodiments and applications of the claimed invention have been shown and described, it would be apparent to those skilled in the art that many more modifications are possible without departing from the inventive concepts herein. The invention, therefore, is not to be restricted except in the spirit of the appended claims.

Claimed is:

1. A method for establishing and controlling the stability and movement of a reaction wave of reacting gases and/or vapors, comprising the steps of
   (a) directing a mixture of said gases and/or vapors with air and/or oxygen into a matrix of solid heat-resistant matter, at least a portion of said matrix initially being above the autoignition temperature of said mixture whereby said mixture ignites in said matrix to initiate said reaction;
   (b) maintaining a stable reaction wave of the reacting mixture by monitoring the temperatures along the flowpath of said mixture through said matrix and adjusting the flow of any of said gases and/or vapor, and air and/or oxygen to maintain and stabilize said reaction wave in said matrix.

2. A method according to claim 1 wherein said reaction wave comprises a combustion wave.

3. A method according to claim 1 further comprising the adjustment of the location of said reaction wave along said flowpath of said mixture through said matrix by (a) adjusting the flow of said gases and/or vapors, and air and/or oxygen, or (b) removing from or adding heat to incoming gases and/or vapors, and air and/or oxygen, or both (a) and (b).

4. A method according to claim 1 wherein said matrix is insulated to retain heat generated by said wave in said matrix.

5. A method according to claim 1 further comprising a step of adding heat to said matrix and/or to incoming gases to further control stability and movement of said wave within said matrix.

6. A method according to claim 2 wherein the gaseous products of said combustion wave are characterized by low $NO_x$ content.

7. A method according to claim 6 wherein said $NO_x$ content is in the range of 0.1 to 40.0 ppm by volume, dry basis, adjusted to 3% oxygen.

8. A method according to claim 2 wherein the gaseous products of said combustion wave have a carbon monoxide content in the range of 0.1 to 10 ppm, by volume, dry basis, adjusted to 3% oxygen.

9. A method according to claim 2 wherein products of incomplete combustion from said combustion wave comprise less than about 5 ppm of the gaseous products, by volume, dry basis, adjusted to 3% oxygen.

10. A method according to claim 1 wherein concentrations of incoming reactants for said reaction wave are maintained at or below the lower explosion limit of said mixture.

11. A method according to claim 1 wherein fuel concentrations of incoming reactants for said reaction wave are maintained between the upper and lower flammability limits of said mixture.

12. A method according to claim 1 wherein concentrations of incoming reactants for said reaction wave are maintained above the upper flammability limit of said mixture.

13. A method according to claim 1 wherein said gases and/or vapors comprise a hydrocarbon.

14. A method according to claim 1 wherein said gases and/or vapors comprise vapors of an organic liquid.

15. A method according to claim 14 wherein said vapors of organic liquids are selected from the group consisting of oxygenated hydrocarbons, halogenated compounds, aminated compounds and sulphur-containing compounds.

16. A method according to claim 1 wherein said mixture is introduced into said matrix in a continuous manner.

17. A method according to claim 1 wherein said mixture is introduced into said matrix in an intermittently varying manner.

18. A method according to claim 1 wherein said reaction wave is maintained in said matrix in a position whereby stability of said wave is at least in part maintained by inner-body surface radiation from insulation and/or said materials in said bed.

19. A method according to claim 1 wherein said reaction wave is stabilized in a position in said matrix whereby stability of said wave is at least in part maintained by forced convection between said matrix and said incoming gases and/or vapors, air and/or oxygen.

20. A method according to claim 1 wherein the matrix burning velocity of said mixture in said matrix is maintained or increased upon increase of pressure within said matrix.

21. A method according to claim 1 wherein said wave is maintained at a uniform temperature along directions perpendicular to the flow axis.

22. A method according to claim 1 wherein said heat-resistant matter in said matrix comprises objects of sizes selected to obtain a predetermined mean-free radiative path in said matrix.

23. A method according to claim 1 wherein the emissivity of said matter in said bed varies to obtain a predetermined back heat transfer characteristic from said particles into the wave.

24. A method according to claim 2 wherein said combustion wave is characterized by lack of a flame.

25. A method according to claim 2 wherein said combustion wave is stabilized at feed flowrates such that the calculated velocity of the mixture of gases entering said wave, adjusted to conditions of standard temperature and pressure, is greater than the laminar flamespeed of said mixture at said conditions in absence of said matrix.

26. A method according to claim 25 wherein said calculated velocity is 1.0 to 1000 times greater than said laminar flamespeed.

27. A method according to claim 26 wherein said calculated velocity is 1.0 to 50 times greater than said laminar flamespeed.

28. A method according to claim 2 wherein said combustion wave is stabilized at feed flowrates such that the calculated velocity of the mixture of gases entering the reaction wave, adjusted to conditions of standard temperature and pressure, is greater than the turbulent flamespeed of said mixture at said conditions in absence of said matrix.

29. A method according to claim 28 wherein said calculated velocity is 1.0 to 1000 times greater than said turbulent flamespeed.

30. A method according to claim 29 wherein said calculated velocity is 1.0 to 10 times greater than said turbulent flamespeed.

31. A method according to claim 2 wherein the temperature required to initiate and sustain the combustion wave in said matrix is less than the autoignition temperature of said mixture at identical conditions in absence of said matrix.

32. A method according to claim 2 wherein said step of maintaining said combustion wave is performed by adjusting said flow of gasses to form a wave characterized by a heat release per unit cross-sectional area which is higher than the heat release per unit cross-sectional area observed in a laminar or turbulent flame of an identical mixture at identical conditions in absence of said matrix.

33. A method according to claim 32 wherein said formed combustion wave is characterized by a heat release per unit cross-sectional area which is 1.0 to 50 times higher than the heat release per unit cross-sectional area observed in a laminar flame of an identical mixture at an identical conditions in absence of said matrix.

34. A method according to claim 32 wherein said formed combustion wave is characterized by a heat release per unit cross-sectional area which is 1.0 to 50 times higher than the heat release per unit cross-sectional area observed in a turbulent flame of an identical mixture at identical conditions in absence of said matrix.

35. A method according to claim 1 wherein said mixture is directed through a plenum prior to entering said matrix.

36. A method according to claim 35 wherein said plenum comprises one or more layers of random packing material.

37. A method according to claim 36 wherein said layers are configured to achieve a pressure drop through the layers.

38. A method according to claim 1 wherein said matrix comprises a ceramic.

39. A method according to claim 38 wherein said matrix comprises random packing.

40. A method according to claim 39 wherein said random packing comprises ceramic balls.

41. A method according to claim 40 wherein said balls are from 1/16" to 3" in diameter.

42. A method according to claim 41 wherein said balls are about ¾" in diameter.

43. A method according to claim 39 wherein said random packing comprises ceramic saddles.

44. A method according to claim 43 wherein said saddles are from 1/16" to 3" nominal size.

45. A method according to claim 44 wherein said saddles are ¼" to 1.5" nominal size.

46. A method according to claim 38 wherein said matrix comprises structured ceramic packing.

47. A method according to claim 38 wherein said matrix comprises a ceramic foam material.

48. A method according to claim 47 wherein said ceramic foam material has a void fraction of 10 to 99%.

49. A method according to claim 48 wherein said ceramic foam material has a void fraction of 75 to 95%.

50. A method according to claim 49 wherein said ceramic foam material has a void fraction of about 90%.

51. A method according to claim 47 wherein said ceramic foam material has a pore size of 0.1 to 1000 pores per inch.

52. A method according to claim 51 wherein said ceramic foam material has a pore size of 1 to 100 pores per inch.

53. A method according to claim 52 wherein said ceramic foam material has a pore size of about 10 to 30 pores per inch.

54. A method according to claim 38 wherein said ceramic matrix comprises a ceramic honeycomb shaped material.

55. A method according to claim 1 wherein said heat-resistant matter comprises a metal matrix.

56. A method according to claim 55 wherein said metal matrix comprises random metal packing.

57. A method according to claim 55 wherein said metal matrix comprises structured metal packing.

58. A method according to claim 1 further comprising the step of preheating said matrix and/or said mixture of gases prior to introduction of said gases and/or vapors into said matrix.

59. A method according to claim 58 wherein said step of preheating is by a pre-heating burner.

60. A method according to claim 58 wherein said step of preheating is by an electric heater.

61. A method according to claim 2 wherein said combustion wave is characterized by a length scale of greater than 0.1 centimeter.

62. A method according to claim 61 wherein said combustion wave is characterized by a length scale of 2 to 16 inches.

63. A method according to claim 62 wherein said combustion wave is characterized by a length scale of about 8 inches.

64. A method according to claim 2 wherein said combustion wave is characterized by a length scale of 1.0 to $10^9$ times the combustion wave length scale of an identical mixture, combusting under identical conditions, in absence of said matrix.

65. A method according to claim 64 wherein said combustion wave is characterized by a length scale of 1.0 to $10^6$ times the combustion wave length scale of an identical mixture, combusting under identical conditions, in absence of said matrix.

66. A method according to claim 65 wherein said combustion wave is characterized by a length scale of 1.0 to 1000 times said combustion wave length scale of said identical mixture.

67. A method according to claim 66 wherein said combustion wave is characterized by a length scale of 1.0 to 100 times said combustion wave length scale of said identical mixture.

68. A method according to claim 17 wherein said mixture is introduced into said matrix with intermittently varying composition of one or more constituents.

69. A method according to claim 17 wherein said mixture is introduced into said matrix with intermittently varying inlet temperature.

70. A method according to claim 17 wherein said mixture is introduced into said matrix with intermittently varying flowrate.

71. A method according to claim 1 wherein said reaction wave is maintained in said bed in a position whereby stability of said wave is at least in part maintained by a mechanism of inner-body surface radiation from insulation and/or said materials in said matrix, by thermal conduction through the solid portion of the matrix and/or matrix elements, or by forced convection between said matrix and said incoming gases and/or vapors, air and/or oxygen.

72. A method according to claim 1, wherein the gaseous reactants are admitted to said matrix through a series of inlet ports, spaced at regular or irregular intervals along the flow axis, to govern the overall rate of reaction in the matrix.

73. A method according to claim 1, wherein the mechanical integrity of said matrix is maintained by a gas-permeable membrane.

74. A method according to claim 2, wherein the gaseous products of said combustion wave contain levels of nitrous oxide ($N_2O$) which do not exceed 0.3 parts per million by volume.

75. A method according to claim 1, wherein said matrix comprises an interface formed by selecting said heat-resistant matter such that the mean free radiative path in said matrix, or the emissivity of said matter, or the shape of said matter, or the surface area per unit volume of said matter, or the bed particle size of particles comprising said matrix, or the thermal conductivity of said matter, or the point to point surface contact area of particles comprising said matrix, or the void fraction on respective sides of said interface are different from each other.

76. A method according to claim 1, wherein the free-flow area of the matrix is varied, through changes in matrix void fraction or geometric cross-sectional area, along the flow axis to provide for a range of inlet gas flowrates concurrent with a single matrix burning velocity.

77. An apparatus for controlled reaction of gases and/or vapors in a stable reaction wave comprising
 a. a matrix of solid heat-resistant matter;
 b. means for introducing gases and/or vapors into said matrix;
 c. means for mixing air and/or oxygen with said gases and/or vapors;
 d. means for controlling the volume and/or flowrate of said gases and/or vapors, air and/or oxygen into said matrix;
 e. means for monitoring the temperature in said matrix,
 f. means for adjusting said flowrate and/or volume in response to temperature changes in said matrix;
 g. means for exhausting gases from said matrix.

78. An apparatus according to claim 77 wherein said matrix insulated to retain heat within said bed.

79. An apparatus according to claim 77 further comprising a plenum for mixture of said vapors, gases, oxygen and/or air before introduction into said matrix.

80. An apparatus according to claim 77 wherein said heat-resistant material comprises a ceramic.

81. An apparatus according to claim 77 further comprising means for preheating said matrix and/or incoming gases prior to introduction of said gases and/or vapors into said matrix.

82. A apparatus according to claim 77 wherein said heat-resistant matter in said matrix comprises objects of sizes selected to obtain a predetermined mean-free radiative path in said matrix.

83. A apparatus according to claim 77, wherein the emissivity of said matter in said matrix varies to obtain a predetermined back heat transfer characteristic from solids comprising said matter back into a reaction wave in said matrix.

84. An apparatus according to claim 79 wherein said plenum comprises one or more layers of random packing material.

85. An apparatus according to claim 84 wherein said layers are configured to achieve a pressure drop across the interfaces between layers.

86. An apparatus according to claim 77 wherein said matrix comprises random packing.

87. An apparatus according to claim 86 wherein said random packing comprises ceramic balls.

88. An apparatus according to claim 87 wherein said balls are from 1/16" to 3" in diameter.

89. An apparatus according to claim 88 wherein said balls are about ¾" in diameter.

90. An apparatus according to claim 86 wherein said random packing comprises ceramic saddles.

91. An apparatus according to claim 90 wherein said saddles are from 1/16" to 3" nominal size.

92. An apparatus according to claim 91 wherein said saddles are ½" to 1.5" nominal size.

93. An apparatus according to claim 77 wherein said matrix comprises structured ceramic packing.

94. An apparatus according to claim 77 wherein said matrix comprises a ceramic foam material.

95. An apparatus according to claim 94 wherein said ceramic foam material has a void fraction of 10 to 99%.

96. An apparatus according to claim 95 wherein said ceramic foam material has a void fraction of 75 to 95%.

97. An apparatus according to claim 96 wherein said ceramic foam material has a void fraction of about 90%.

98. An apparatus according to claim 94 wherein said ceramic foam material has a pore size of 0.1 to 1000 pores per inch.

99. An apparatus according to claim 98 wherein said ceramic foam material has a pore size of 5 to 100 pores per inch.

100. An apparatus according to claim 99 wherein said ceramic foam material has a pore size of about 10 to 30 pores per inch.

101. An apparatus according to claim 80 wherein said ceramic matrix comprises a ceramic honeycomb shaped material.

102. An apparatus according to claim 77 wherein said heat-resistant matter comprises a metal matrix.

103. An apparatus according to claim 102 wherein said metal matrix comprises random metal packing.

104. An apparatus according to claim 102 wherein said metal matrix comprises structured metal packing.

105. An apparatus according to claim 81 wherein said preheating means comprises a pre-heating burner.

106. An apparatus according to claim 81 wherein said preheating means comprises an electric heater.

107. An apparatus according to claim 77, wherein said means for introducing gases comprises inlet ports, spaced at regular or irregular intervals along the flow axis, to govern the overall rate of reaction in said matrix.

108. An apparatus according to claim 77, further comprising a gas permeable membrane to maintain the mechanical integrity of said matrix.

* * * * *

UNITED STATES PATENT AND TRADEMARK OFFICE
CERTIFICATE OF CORRECTION

PATENT NO. : 5,165,884
DATED : November 24, 1992
INVENTOR(S) : Martin et al.

It is certified that error appears in the above-indentified patent and that said Letters Patent is hereby corrected as shown below:

Column 6, line 61, change "pp" to --ppm--.

Column 9, line 38, change "a" to --an--.

Column 12, line 19, after "wherein" delete the word --fuel--.

Column 12, line 46, change "bed" to --matrix--.

Column 15, line 68, change "bed" to --matrix--.

Column 16, line 5, after "ceramic" insert --matrix--.

Signed and Sealed this

Twenty-ninth Day of November, 1994

BRUCE LEHMAN

Attest:

Attesting Officer

Commissioner of Patents and Trademarks